United States Patent [19]

Jacobson

[11] 3,909,548

[45] Sept. 30, 1975

[54] SPEAKER TELEPHONE

[76] Inventor: Sava W. Jacobson, 4915 Tyrone Ave., Sherman Oaks, Calif. 91403

[22] Filed: Dec. 7, 1973

[21] Appl. No.: 422,968

[52] U.S. Cl. .......... 179/81 B

[51] Int. Cl.[2] .......... H04M 1/60

[58] Field of Search .......... 179/81 B, 1 HF, 100 L, 179/1 VC, 170.8, 170.2

[56] References Cited

UNITED STATES PATENTS

| | | | |
|---|---|---|---|
| 3,046,354 | 7/1962 | Clemency | 179/81 B |
| 3,330,912 | 7/1967 | Koseki | 179/81 B |
| 3,562,791 | 2/1971 | Baker | 179/1 HF |
| 3,610,835 | 10/1971 | Reid | 179/81 B |
| 3,725,585 | 4/1973 | Moniak et al. | 179/1 HF |

*Primary Examiner*—Kathleen H. Claffy
*Assistant Examiner*—Joseph Popek
*Attorney, Agent, or Firm*—Howard A. Silber

[57] ABSTRACT

In this speaker telephone, the amplified microphone signal is supplied via a diode to a hybrid network and thence to the telephone line. Audio incoming from the telephone line is supplied via the hybrid network to an incoming amplifier and a loudspeaker. The incoming amplifier input is shunted by a transistor switch which is normally biased off. Occurrence of a control signal (a) forward biases the diode to enable outgoing speech transmission, and (b) turns on the transistor switch to short out the incoming amplifier input. In a control circuit, the microphone output is further amplified by a first transistor and then rectified to produce the control signal. A second transistor is connected to permit amplification by the first transistor, and hence occurrence of a control signal, only in the absence of an output from the incoming amplifier. This arrangement insures that only speech transmission to the line, or only loud speaker reproduction of the incoming signal will occur at any time, and further insures that switch-over from one such mode to the other will occur only during pauses between syllables or words.

13 Claims, 1 Drawing Figure

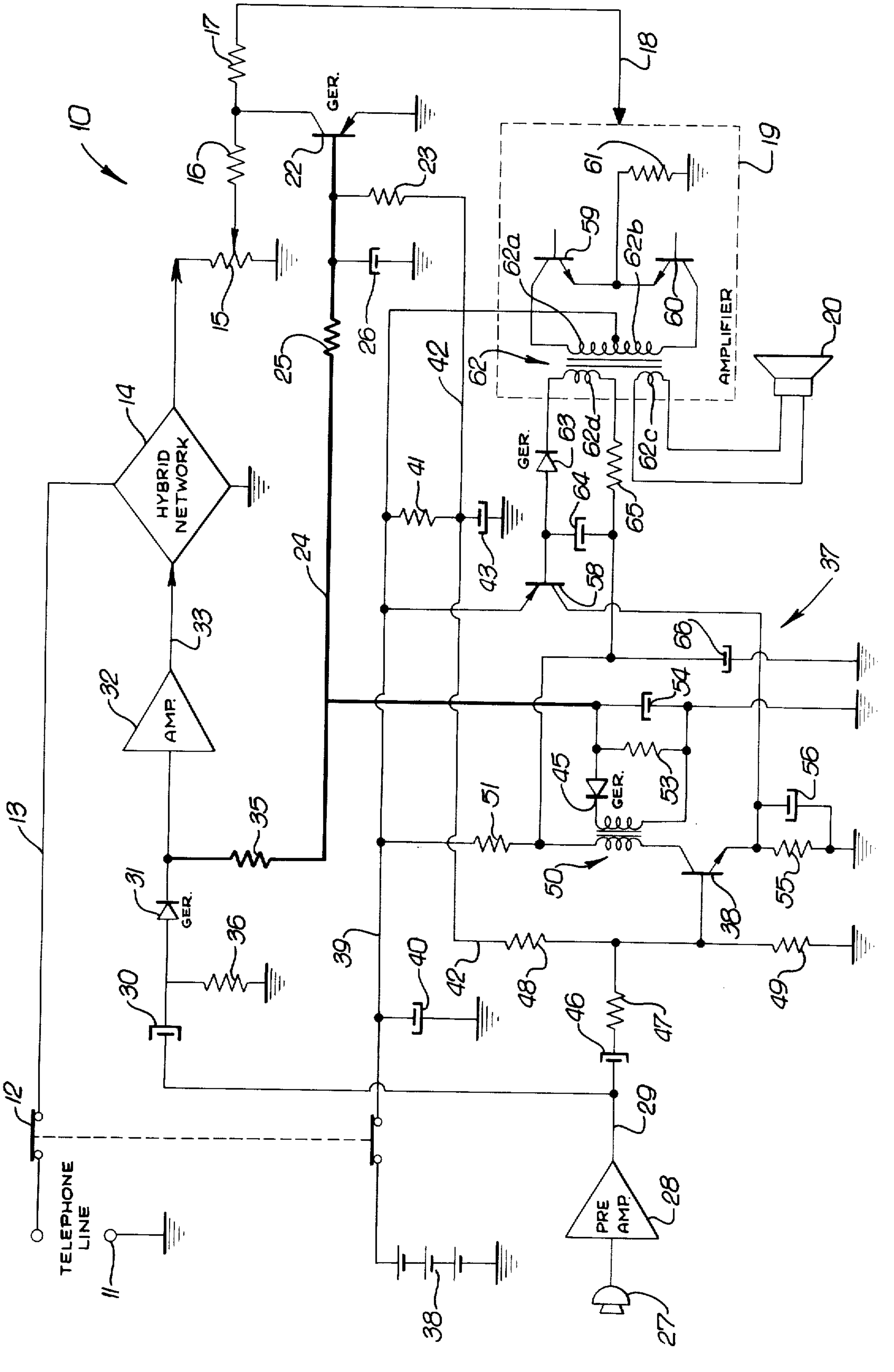
TELEPHONE LINE
HYBRID NETWORK
AMP.
PRE AMP.
AMPLIFIER
GER.

SPEAKER TELEPHONE

BACKGROUND OF THE INVENTION

1. Field of the Invention

The present invention relates to a speaker telephone, and particularly to a control circuit for such instrument.

2. Description of the Prior Art

Speaker telephones offer the convenience of "no hands" operation. The incoming signal is amplified and reproduced by a loudspeaker. The user's voice is picked up by a microphone and amplified for transmission to the line. Isolation between the outgoing and incoming functions is provided by a hybrid network, provision being made to prevent feedback and microphonics. Usually the incoming amplifier is clamped off by voice actuated circuitry during speech transmission.

Available speaker telephones suffer certain disadvantages. Some require the handset to be lifted from the telephone instrument and placed on an acoustic coupler. In others, pick-up gain is severely limited to prevent feedback and microphonics; the user must speak close to the microphone, reducing its convenience. In other systems, circuit complexity makes the cost too great for home use. An object of the present invention is to provide a speaker telephone having none of these shortcomings.

SUMMARY OF THE INVENTION

This is achieved by providing a speaker telephone in which a unique control circuit provides a control signal that performs two functions. Occurrence of the control signal (a) forward biases a diode connected in series with the microphone amplifier output to enable speech transmission, and (b) turns on a germanium transistor switch to short out the incoming amplifier input, and hence inhibit loudspeaker reproduction of the incoming signal.

The control circuit uses two transistors connected in a bias stabilized arrangement. The first transistor further amplifies the microphone output which in turn is rectified to produce the control signal. The second transistor is connected to disable amplification by the first transistor upon occurrence of an output from the incoming amplifier. This arrangement is such that an incoming signal will not be supplied to the loudspeaker during speech transmission from the microphone, and further, that the change over from speech transmission to reception, or vice versa, will only occur during pauses between syllables or words.

BRIEF DESCRIPTION OF THE DRAWING

A detailed description of the invention will be made with reference to the accompanying drawing, which is an electrical schematic diagram of the inventive speaker telephone.

DESCRIPTION OF THE PREFERRED EMBODIMENT

The following detailed description is of the best presently contemplated mode of carrying out the invention. This description is not to be taken in a limiting sense, but is made merely for the purposes of illustrating the general principles of the invention since the scope of the invention best is defined by the appended claims.

As shown in the drawing, the inventive speaker telephone 10 is connected to a telephone line via the terminals 11. Audio incoming from the telephone line is supplied via an "on-off" switch 12, a line 13, a conventional hybrid network 14, a volume control 15 and a pair of series connected resistors 16, 17 to the input 18 of an amplifier 19. The amplifier 19 amplifies the incoming audio signal for reproduction by a loudspeaker 20.

The input of the amplifier 19 effectively is shunted by a germanium PNP transistor 22 having a dc collector-to-emitter voltage of zero. The transistor 22 normally is biased off by a voltage provided via a resistor 23. With the transistor 22 off, the collector-to-emitter impedance is high so that input to the amplifier 19 is not shorted out. Hence audio from the telephone line will be amplified and reproduced by the speaker 20. However, upon occurrence of a control signal (of negative polarity) on a control line 24, the transistor 22 will switch on, resulting in a very low collector-to-emitter impedance. This effectively shorts the input of the amplifier 19 to ground, thereby inhibiting amplification and loudspeaker reproduction of incoming audio signals. A resistor 25 and a capacitor 26 connected in the base circuit of the transistor 22 filter out any residual speech voltage on the control line 24.

Speech transmission is facilitated by a microphone 27 and an associated preamplifier 28. Audio from the preamplifier 28 is supplied via a line 29, a capacitor 30, a diode 31 and an amplifier 32 to a terminal 33 of the hybrid network 14. This network 14 functions in a conventional manner to direct the outgoing signal, supplied via the terminal 33, only via the line 13 to the telephone line; essentially none of the outgoing signal will be supplied to the incoming volume control 15.

The control line 24 is connected via a resistor 35 to the junction between the cathode of the diode 31 and the amplifier 32. Thus occurrence of a negative polarity control signal on the line 24 will forward bias the diode 31 into conduction, insuring audio signal flow from the preamplifier 28 to the amplifier 32. A resistor 36 completes the dc path through the diode 31.

The control signal on the line 24 is produced by a control circuit 37 which, like the other circuitry of the device 10, is powered by a battery 38 or other dc source. The positive dc voltage, supplied via the switch 12 and a line 39, is filtered by a capacitor 40. Bias voltage to the transistor 22 is supplied from the line 39 via an isolating resistor 41, a line 42 and a filter capacitor 43.

Within the control circuit 37, the transistor 38 further amplifies the microphone output from the preamplifier 28. This amplified signal is rectified by a diode 45 to produce the control signal on the line 24.

To this end, the signal on the line 29 is supplied to the base of the transistor 38 via a capacitor 46 and a resistor 47. Base bias is provided by a pair of resistors 48, 49 connected in series between the isolated dc line 42 and ground. The output signal from the transistor 38 is developed across a transformer 50, the primary of which is series connected between the collector of the transistor 38 and a resistor 51 leading to the dc source line 39. The diode rectifier 45, preferably germanium, is series connected with a load resistor 53 across the secondary of the transformer 50. The resultant negative dc control signal developed across the resistor 53 is filtered by a capacitor 54 and supplied to the line 24. The emitter of the transistor 38 is connected to ground via a resistor 55 shunted by a capacitor 56.

Amplification by the transistor 38, and hence production of the control signal on the line 24, is inhibited by an output signal from the incoming amplifier 19. To this end, a complementary transistor 58 is connected between the dc source line 39 and the emitter of the transistor 38. In the embodiment shown, the amplifier 19 has a push-pull output stage including a pair of transistors 59, 60 the emitters of which are connected to ground via a resistor 61 and the collectors of which are connected to the respective primary windings 62*a*, 62*b* of an output transformer 62. The signal developed across one output winding 62*c* of the transformer 62 is fed to the loudspeaker 20. The signal developed across the other secondary winding 62*d* is rectified by a germanium diode 63, filtered by a capacitor 64 and a resistor 65, and supplied to the base of the transistor 58. With this arrangement occurrence of an output from the amplifier 19 causes the transistor 58 to draw more current, thereby increasing the voltage at the emitter of the transistor 38. This causes the transistor 38 to lose again, and inhibits production of the control signal on the line 24.

To insure nearly complete cut-off of the transistor 38 with even a small output from the amplifier 19, the transistor 58 is connected in bias stabilized arrangement with the transistor 38. A sample of the collector current to the transistor 38 is supplied to the base of the transistor 58 in series with the output from the amplifier 19. The sample current, obtained from the junction between the transformer 50 and the resistor 51, is filtered by a capacitor 66 and fed to the transistor 58 via the resistor 65, the transformer winding 62d and the diode 63.

With no output from the amplifier 19, the base of the transistor 58 adjusts itself to a voltage equal to that on the line 39 minus the base-emitter voltage (typically 0.6 volts for a silicon transistor) of the transistor 58. This in turn establishes the amount of current flow through the resistor 51, thereby stabilizing the entire circuit. With this arrangement, there is a highly non-linear current-voltage relationship at the base of the transistor 58. As a result, even a small output voltage from the amplifier 19, rectified and supplied via the diode 63 to the base of the transistor 58, will cause rapid increase of conduction in the transistor 58 and near cut-off of the transistor 38. For example, this might occur when, during a pause in the outgoing speech, audio is received from the telephone line.

To summarize, when speech is being neither transmitted nor received by the speaker telephone 10, no control signal is present on the control line 24. Both the transistor switch 22 and the diode 31 are open. Thus, an incoming signal from the telephone line will be passed to the amplifier 19 for reproduction by the speaker 20. The incoming amplifier 19 output signal, rectified by the diode 63, causes increased conduction of the transistor 58 and near cut-off of the transistor 38. This prevents occurrence of the control signal on the line 24, and hence inhibits microphone speech transmission, at least until a pause between syllables or words of the incoming speech.

When such pause occurs, there is no output from the amplifier 19, hence the transistor 38 is at nominal gain. If speech now is picked up by the microphone 27, the resultant signal amplified by the transistor 38 and rectified by the diode 45 will appear on the line 24 as a negative potential control signal. This control signal forward biases the diode 31, thereby allowing speech transmission from the microphone 28 to the telephone line. Occurrence of the control signal also causes turn-on of the transistor 22 to short out the input to the amplifier 19. This insures that no signal will be supplied to the amplifier 19, and hence that no output will occur from that amplifier, so long as speech transmission continues. Of course, the absence of an output from the amplifier 19 insures that the transistor 38 will not be cut off during such microphone speech transmission. As noted above, in the pauses between transmitted syllables or words, the control signal will not be present. Thus during such a pause, incoming audio will be supplied to the amplifier 19 for reproduction by the speaker 20. This incoming signal will preempt transmission until a subsequent pause.

The speed of break-in is controlled primarily by the time constants of the resistor 53 and the capacitor 54, and the resistor 65 and capacitor 64. Typically the values of these components will be selected to give a break-in speed of about 0.25 seconds in each direction. However, the time constants are not critical, and may be different for transmission and reception.

Intending to claim all novel, useful and unobvious features shown or described, the applicant makes the following claims:

1. In a speaker telephone having a microphone and an associated microphone amplifier, a speaker, an incoming amplifier for amplifying incoming signals for reproduction by said speaker, and a hybrid network for coupling a signal from said microphone amplifier to a telephone line and for coupling signals from said telephone line to said incoming amplifier, the improvement therewith of:

a diode connected in series between the output of said microphone amplifier and said hybrid network, a transistor switch, having a control element, shunted across the input of said incoming amplifier, a control circuit receiving as separate inputs both the output of said microphone amplifier and the output of said incoming amplifier and providing a common control signal to both said diode and the control element of said transistor switch, occurrence of said common control signal causing said transistor switch to disable the input of said incoming amplifier, and forward biasing said diode to permit signal flow therethrough from said microphone amplifier to said hybrid network, said control circuit comprising;

a first transistor, having a control electrode, connected to amplify the output received from said microphone amplifier, first rectifier means for rectifying the amplified signal from said first transistor to provide said rectified signal as said control signal, and control means, connected to the control electrode of the first transistor, for permitting amplification by said first transistor to begin only in the absence of an output from said incoming amplifier, said control means comprising;

second rectifier means for rectifying the output of said incoming amplifier, and a second transistor biased on by the rectified output from said second rectifier means and connected to the control electrode of the first transistor to disable amplification by said first transistor when said second transistor is biased on.

2. A speaker telephone according to claim 1 wherein said first and second transistors are of complementary types, the non-control elements of said second transistor being series connected between a source of dc potential and one non-control element of said first transistor, a current sample from the other non-control element of said first transistor being supplied in series with said rectified incoming amplifier output to the control element of said second transistor, whereby said second transistor establishes the bias level of said first transistor in the absence of output signals from either said microphone amplifier or said incoming amplifier, and whereby gain control of said first transistor is achieved.

3. A speaker telephone according to claim 2 wherein said first and second rectifier means each comprise a germanium diode rectifier and a resistor-capacitor filter for filtering the rectified signal.

4. A speaker telephone according to claim 2 wherein said first transistor is an NPN type, wherein said second transistor is a PNP type, and wherein the collector of said second transistor is connected to the emitter of said first transistor.

5. A speaker telephone according to claim 4 wherein the collector of said first transistor is connected to said dc source via the primary of a first transformer and a first resistor, and wherein said first rectifier means comprises a diode connected to the secondary of said first transformer and a capacitor and resistor connected to filter the rectified signal from said diode.

6. A speaker telephone according to claim 5 wherein said incoming amplifier has an output transformer with two secondary windings, said speaker being connected to one of said secondary windings, said rectifier means comprising:

a diode connected between one terminal of the other secondary winding and the base of said second transistor, a resistor connected between the other terminal of said other secondary winding to the junction of said first transformer primary and said first resistor, and a capacitor connected between the base of said second transistor and said junction.

7. A speaker telephone according to claim 6 wherein said incoming amplifier has a push-pull output stage with two primary windings on said output transformer, both primary windings having the same number of turns, and wherein the turns ratio between either primary winding and said one secondary winding is 2:1 and between either primary winding and said other secondary winding is 2:3.

8. A speaker telephone according to claim 2 wherein said transistor switch comprises a PNP type, germanium transistor having its emitter and collector connected effectively to short out the input of said incoming amplifier when said germanium transistor conducts, said germanium transistor normally being base biased off, said control signal being connected to the base of said germanium transistor so that occurrence of said control signal biases said germanium transistor into conduction.

9. A speaker telephone according to claim 2 wherein said diode is germanium and is series connected between the output of said microphone amplifier and said hybrid network, said control signal being connected to said diode so that occurrence of said control signal forward biases said diode.

10. A control circuit for a speaker telephone of the type wherein an amplified microphone signal is transmitted to a telephone line via a hybrid network and wherein audio from the telephone line is supplied via said hybrid network and an amplifier to a loudspeaker, said control circuit comprising:

a first transistor connected to amplify said microphone signal, the amplified signal being rectified to provide a control signal, a second transistor interconnected to disable amplification by said first transistor to inhibit provision of said control signal, in response to occurrence of an output from said amplifier, and control means for enabling transmission of said amplified microphone signal and for inhibiting amplification of said incoming audio during occurrence of said control signal, and wherein said first and second transistors are of complementary type, wherein the collector of said second transistor is connected to the emitter of said first transistor, wherein the rectified output of said amplifier is supplied to the base of said second transistor, and wherein a sample of the first transistor collector current is supplied to the base of said second transistor together with said rectified output.

11. A control circuit according to claim 10 wherein said control means comprises:

a diode series connected in the transmission path of said amplified microphone signal, said diode being forward biased into conduction by said control signal, and a transistor switch connected effectively to short out the input to said amplifier when said switch is turned on by occurrence of said control signal, and wherein the control signal is filtered by a first resistor-capacitor network and wherein the rectified output of said amplifier is filtered by a second resistor-capacitor network, the time constants of said resistor-capacitor networks establishing the break-in times for said speaker telephone.

12. In a speaker telephone in which audio incoming from a telephone line is amplified by an amplifier, the improvement comprising:

circuit means connecting said telephone line to the input of said amplifier, so that said incoming audio will be amplified by said amplifier only when said amplifier input is not shorted out, a germanium transistor connected across the input of said amplifier with a dc emitter-to-collector voltage of zero, and control means for providing base bias to said germanium transistor during speech transmission from said speaker telephone, said bias causing the collector-to-emitter impedance to drop to a level at which the input to said amplifier is effectively shorted out so that said incoming audio will not be amplified by said amplifier during speech transmission.

13. A control circuit for a speaker telephone of the type having a microphone and an associated microphone amplifier, a loudspeaker, a loudspeaker amplifier for amplifying signals incoming from a telephone line for reproduction by said speaker, and a hybrid network for coupling signals from said telephone line to said loudspeaker amplifier, said control circuit comprising first and second complementary transistors respectively receiving the outputs of said microphone amplifier and said loudspeaker amplifier, and wherein:

a. said second transistor is connected to receive at its base, in addition to said loudspeaker amplifier output, a sample of the emitter-to-collector current of said first transistor, an emitter of one of said transistors being connected to the collector of the other of said transistors so as to establish the bias level of said first transistor in the absence of signals from either said microphone amplifier or said loudspeaker amplifier, b. said first transistor, in the absence of an output from said loudspeaker amplifier, being available to amplify speech from said microphone amplifier, the resultant output of said first transistor being rectified by a rectifier to produce a control signal operative to forward bias a diode interconnecting said microphone amplifier and said hybrid network so as to enable microphone speech transmission via said hybrid network to the telephone line and to switch on a transistor switch connected across the input of said loudspeaker amplifier, the resultant low collector-to-emittor impedance of said transistor switch inhibiting the input to said loudspeaker amplifier of incoming signals from said telephone line, and wherein c. in the absence of speech from said microphone amplifier, received speech output from said loudspeaker amplifier causes said second transistor to increase conduction, clamping said first transistor near cut-off so as to prevent amplification by said first transistor and hence to inhibit production of said control signal, so that said diode will block passage of said outgoing speech to said hybrid network, and so that said transistor switch will stay off permitting continued amplification by said loudspeaker amplifier of incoming speech.

* * * * *